United States Patent [19]

Aoki et al.

[11] 4,294,674
[45] Oct. 13, 1981

[54] METHOD OF TREATING WASTE GAS BY IRRADIATION

[75] Inventors: Shinji Aoki, Tokyo; Keita Kawamura; Hitoshi Kimura, both of Fujisawa; Tsutomu Katayama; Chikara Kaido, both of Kitakyushu; Hiroshi Yoshida, Koganei, all of Japan

[73] Assignee: Ebara Corporation, Tokyo, Japan

[21] Appl. No.: 107,500

[22] Filed: Dec. 26, 1979

[30] Foreign Application Priority Data

Dec. 29, 1978 [JP] Japan .................. 53-162153

[51] Int. Cl.³ .............................. B01J 19/08
[52] U.S. Cl. .............................. 204/157.1 H
[58] Field of Search .................. 204/157.1 H

[56] References Cited

U.S. PATENT DOCUMENTS 3,869,362 3/1975 Machi et al. ............. 204/157.1 H
4,146,450 3/1979 Araki et al. ............. 204/157.1 R

FOREIGN PATENT DOCUMENTS 48-17471 3/1973 Japan ..................... 204/157.1 H
52-39377 10/1977 Japan .
52-140499 11/1977 Japan .

Primary Examiner—Howard S. Williams
Attorney, Agent, or Firm—Howard L. Rose

[57] ABSTRACT

There is disclosed an improved method of treating waste gas by electron irradiation with ammonia being added to the waste gas, characterized in that the reaction temperature is held between 50° C. and 80° C. during the treatment.

4 Claims, 6 Drawing Figures

METHOD OF TREATING WASTE GAS BY IRRADIATION

This invention relates to an improved method of removing sulfur oxides ($SO_x$) and/or nitrogen oxides ($NO_x$) from waste gas by irradiation.

Application for patent on a method of irradiating industrial waste gas to convert $SO_x$ and/or $NO_x$ in the gas into an aerosol such as a solid or mist, which is then passed through a dust collector for removal has been made in a copending application by the same inventors. A further study of the method has revealed that the denitrification efficiency, $\eta NO_x$, and desulfurization efficiency, $\eta SO_x$, are affected by the reaction temperature and the total dose, or quantity of radiation energy absorbed by the waste gas. The reaction temperature means the temperature of gas substantially in the center of a vessel containing the gas to be irradiated with radiation (hereunder referred to as the "reaction vessel").

This invention provides an improved method of removing nitrogen oxides (hereunder simply referred to as "denitrifying") and/or removing sulfur oxides (hereunder simply referred to as "desulfurizing") from waste gas by holding the reaction temperature as a suitable level.

The objects and advantages of this invention will be apparent by reading the following detailed description in conjunction with the accompanying drawings, in which.

Figure 3:
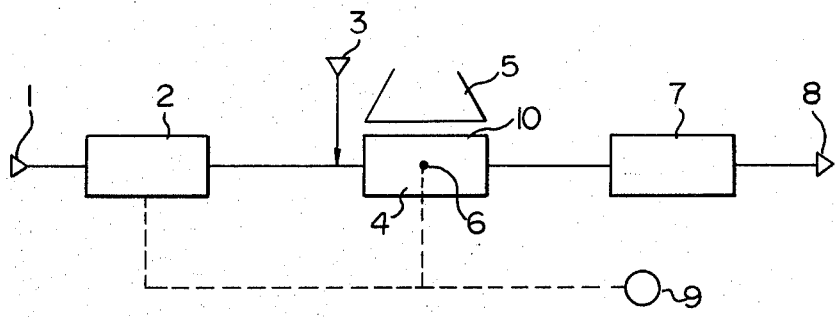
Figure 4:
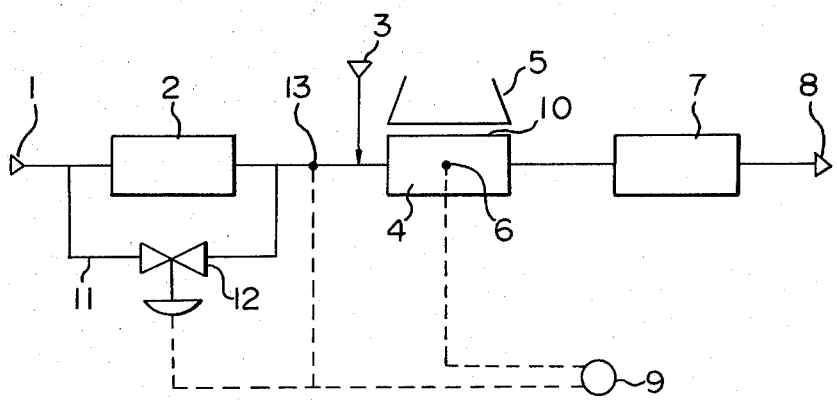
Figure 5:
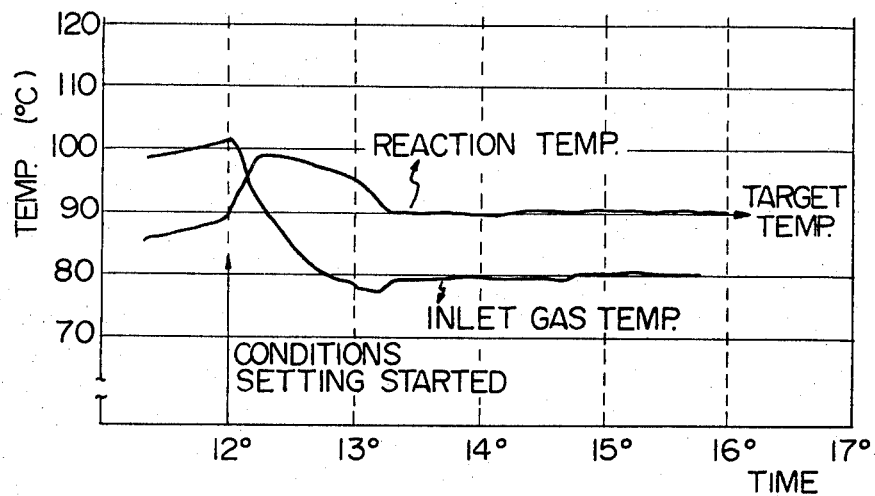
Figure 6:
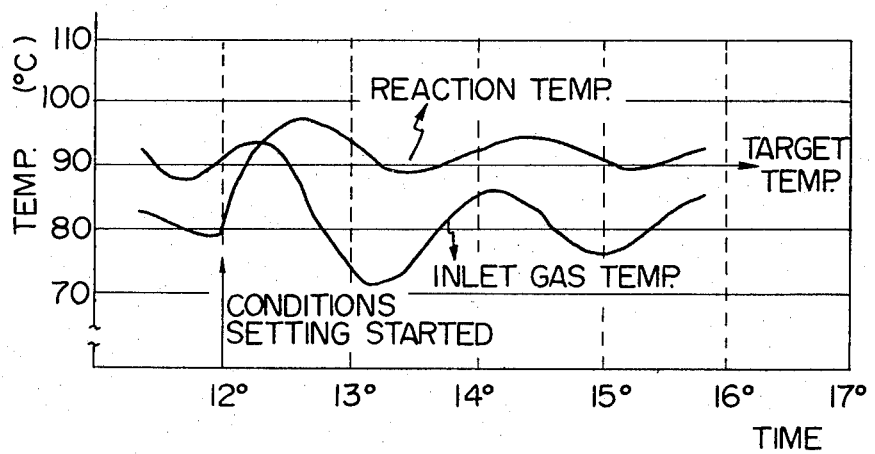

FIG. 3 in a schematic diagram of the conventional apparatus for treating waste gas;

FIG. 4 is a schematic diagram of an improved apparatus for treating waste gas incorporating the concept of this invention;

FIG. 5 is a time chart for the control of the gas temperature according to the improved method of this invention; and FIG. 6 is a time chart for the control of the gas temperature according to the conventional method.

Figure 1:
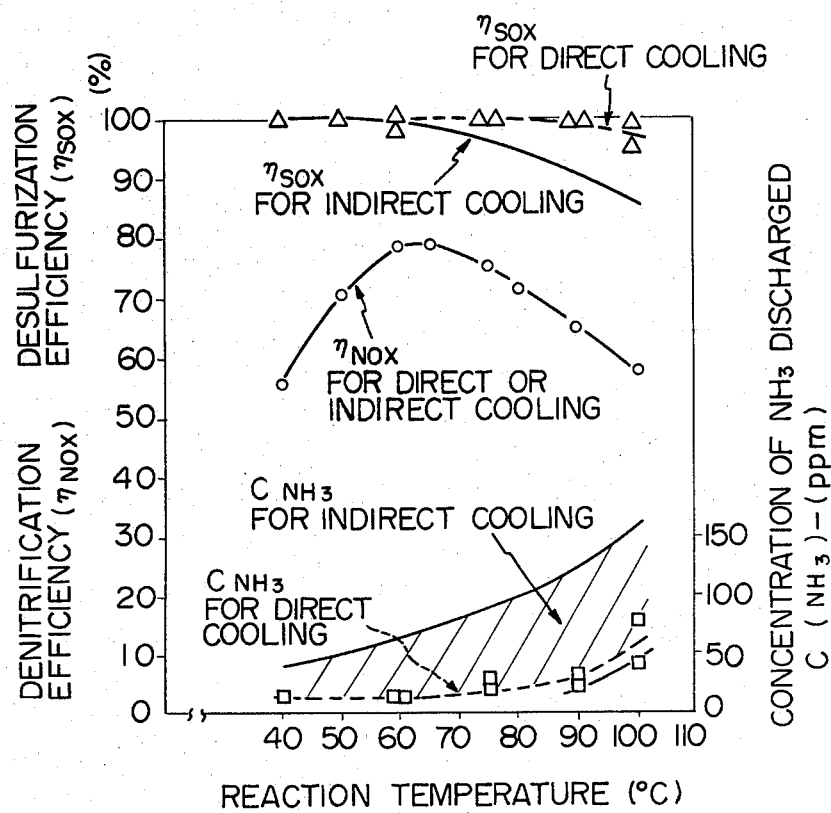
FIG. 1 is a graph showing the relationships between the reaction temperature and each of the denitrification efficiency, $\eta NO_x$, desulfurization efficiency, $\eta SO_x$, and the concentration of ammonia, $C_{NH_3}$, in the gas discharged from the reaction vessel.

The data in FIG. 1 was obtained by supplying the reaction vessel with 3000 Nm³/hr of industrial waste gas containing 200 ppm of $NO_x$ and 200 ppm of $SO_x$ plus about 600 ppm of externally added ammonia ($NH_3$), which was then irradiated with electron beams for a total dose of 1.8 Mrads. The reaction temperature was varied from 40° C. to each of 50° C., 60° C., 65° C., 75° C., 80° C., 90° C. and 100° C. As is shown in FIG. 1, the desulfurization efficiency ($\eta SO_x$) had a tendency to decrease slightly with increasing reaction temperatures, whereas the denitrification efficiency ($\eta NO_x$) varied greatly within the stated temperature range, held high within the range of from 50° to 80° C., peaking at 65° C. It is worth noting that $NO_x$ which was difficult to remove by any prior art method depicted such characteristic curve for $\eta NO_x$ depending upon the gas temperature when it was treated with the method of this invention. In FIG. 1, the terms "direct cooling" and "indirect cooling" are two methods of cooling the waste gas and they will be elucidated hereinbelow.

Figure 2:
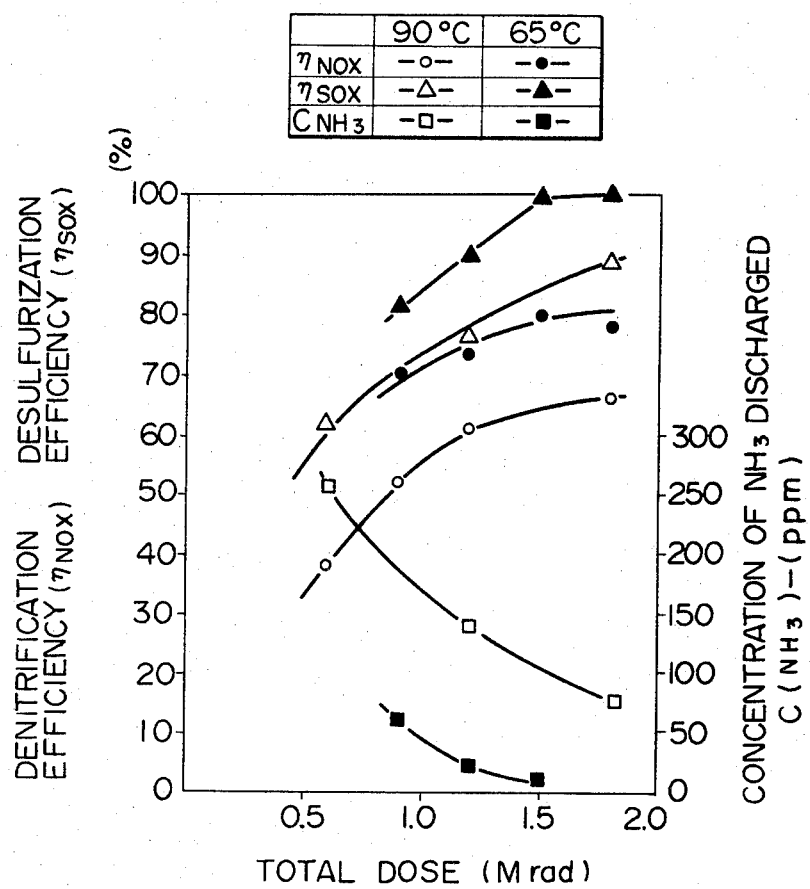
FIG. 2 is a graph showing the relationships between the total dose of radiation an each of denitrification and desulfurization efficiencies, and the concentration of ammonia, $C_{NH_3}$, in the gas discharged from the reaction vessel.

The data in FIG. 2 was obtained by supplying the reaction vessel with 3000 Nm³/hr of industrial waste gas containing 200 ppm of $NO_x$ and 200 ppm of $SO_x$ plus about 600 ppm of externally added ammonia, which was then irradiated with electron beams in varying total doses. Two reaction temperatures, i.e. 65° C. and 90° C., were employed. As is clear from FIG. 2, the reaction temperature of 65° C. gave higher denitrification and desulfurization efficiencies and was more effective in achieving the intended treatment of waste gas at lower total doses.

Therefore, within the range of reaction temperature from 50° C. to 80° C., the denitrification efficiency ($\eta NO_x$) is kept high and the desulfurization efficiency ($\eta SO_x$) is also held virtually at maximum, thus achieving effective denitrification and desulfurization in low total doses. This means an appreciable cut in the initial cost and running cost of the equipment, adding very much to the commercial value of the method of this invention.

A method of holding the reaction temperature within the desired range is hereunder described. FIG. 3 illustrates how such control is achieved in the conventional apparatus for treating waste gas. In the same figure, 1 is an inlet for waste gas, 2 is a gas temperature controller, 3 is a device for supplying ammonia, 4 is a reaction vessel, 5 is the source of radiation, 6 is a gas temperature measuring device, 7 is a dust collector, 8 is an outlet for waste gas, 9 is a temperature recorder, and 10 is the foil that closes the opening of the window of the reaction vessel. As shown, the conventional apparatus first detects the reaction temperature and supplies the detection signal which controls the capacity of a cooler. However, in such method, the reaction vessel having a great heat capacity disposed between the detecting portion and the temperature control section is the cause of hunting of the reaction temperature which therefore requires a long time to rest within the desired range.

As a result of studies to find a more reliable control method, the inventors of this invention have found that the relationship between the gas temperature at the inlet of the reaction vessel ($T_{Rin}$) and the reaction temperature ($T_R$) is represented by the following formula:

$$T_R \approx T_{Rin} + \alpha T_1 + \beta T_2 - \gamma T_3$$

wherein $T_1$: the increase in temperature due to radiation;

$T_2$: the increase in temperature due to the heat of reactions of $NO_x$ and of $SO_x$;

$T_3$: the decrease in temperature due to the heat dissipation from the reaction vessel; and $\alpha, \beta, \gamma$: the constants inherent in the equipment.

The formula indicates that $T_R$ can be held within the desired range by properly controlling $T_{Rin}$.

FIG. 4 illustrates an apparatus for treating waste gas incorporating an improved method of controlling the gas temperature based on the above finding. In the figure, the same numerals as used in FIG. 3 identify the same parts or components, and 11 is a bypass, 12 is a valve, and 13 is a device for measuring the temperature of inlet waste gas. In the new method, the gas temperature at the inlet 13 of the reaction vessel is detected, the detection signal is fed to a temperature-control-system composed of the gas temperature controller 2, the bypass 11 and the valve 12, to thereby control the temperature of gas at the inlet of the reaction vessel. Using the stated relation between $T_{Rin}$ and $T_R$, the reaction temperature can be held within the desired range. Since no object that may affect the gas temperature is disposed between the temperature detecting portion and the circuit composed of 2, 11 and 12, the gas temperature can be stabilized within a short period of time. The improved method of controlling the reaction temperature was compared with the conventional method with the target temperature being set at 90° C., and the results are set forth in FIGS. 5 and 6, from which one can understand that the improved method is far quicker than the conventional method in stabilizing the reaction temperature at the target value. One practical method of controlling the gas temperature is to adjust the ratio of opening of the bypass valve 12 shown in FIG. 4. Alternatively, the supply of the cooling medium may be varied to achieve the same purpose.

Two methods can be used to cool the waste gas for the purpose of controlling the gas temperature at the inlet of the reaction vessel. One is the direct cooling method according to which the waste gas is brought into direct contact with water, or an aqueous alkaline or acidic solution, and the temperature of the waste gas is reduced primarily by the latent heat of vaporization of the liquid. The other is the indirect cooling method wherein a cooling medium such as water is not brought into direct contact with the waste gas to lower the temperature of waste gas but instead, said temperature is reduced by heat conduction between the two masses. Comparison of the two methods made by the inventors of this invention showed that there was little difference between the two methods with respect to the denitrification efficiency ($\eta NO_x$) but that the direct cooling method gave a higher desulfurization efficiency ($\eta SO_x$) and discharged waste gas which invariably contained a smaller amount of ammonia (low $C_{NH_3}$), as shown in FIG. 1. Therefore, the direct cooling method is more advantageous than the indirect cooling method as means for cooling the waste gas.

As will be clear from the foregoing description, effective denitrification and desulfurization of waste gas can be achieved by irradiating the gas with radiation at a reaction temperature held between 50° C. and 80° C.; the proper adjustment of the temperature of the waste gas is advantageously achieved by controlling the temperature of gas at the inlet of the reaction vessel; and the waste gas is reduced to advantage by the direct cooling method. The combination of these three techniques produces a very efficient apparatus for treating waste gas.

What is claimed is:

1. An improved method of treating waste gas containing sulfur oxides and nitrogen oxides and having ammonia added, the waste gases being subjected to ionizing radiation characterized in that the reaction temperature is held between 50° C. and 80° C. during the treatment.

2. A method according to claim 1 wherein the adjustment of the reaction temperature is achieved by controlling the temperature of waste gas at the inlet of a reaction vessel containing the waste gas to be irradiated.

3. A method according to claim 2 wherein the adjustment of the gas temperature is achieved by a cooling system that brings the waste gas into direct contact with a liquid.

4. A method according to claims 1, 2, or 3, wherein said ionizing radiation is electron beam radiation.

* * * * *